United States Patent
Kim et al.

(10) Patent No.: US 9,541,688 B2
(45) Date of Patent: Jan. 10, 2017

(54) POLARIZATION FILM HAVING BLACK STRIP FOR APPLYING TO A PATTERNED RETARDER TYPE 3D DISPLAY DEVICE

(71) Applicant: LG DISPLAY CO., LTD., Seoul (KR)

(72) Inventors: Jinyeong Kim, Gyeonggi-do (KR); Heeyoung Chae, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 174 days.

(21) Appl. No.: 13/677,677

(22) Filed: Nov. 15, 2012

(65) Prior Publication Data
US 2013/0314783 A1    Nov. 28, 2013

(30) Foreign Application Priority Data
May 23, 2012   (KR) .................. 10-2012-0054973

(51) Int. Cl.
| | |
|---|---|
| *G02B 5/30* | (2006.01) |
| *G02B 27/28* | (2006.01) |
| *G02B 5/20* | (2006.01) |
| *G02B 27/26* | (2006.01) |

(52) U.S. Cl.
CPC .............. *G02B 5/3041* (2013.01); *G02B 5/201* (2013.01); *G02B 5/3033* (2013.01); *G02B 5/3083* (2013.01); *G02B 27/26* (2013.01); *G02B 27/28* (2013.01)

(58) Field of Classification Search
CPC ....... G02B 5/30; G02B 5/3083; G02B 5/3033; G02B 27/26; G02B 27/28; G02B 5/3041; H04N 13/0434
USPC ......... 359/464, 465, 483.01, 487.01, 489.07; 349/15, 96, 117
See application file for complete search history.

(56) References Cited

U.S. PATENT DOCUMENTS

| | | | | |
|---|---|---|---|---|
| 5,731,050 A | * | 3/1998 | Kotsubo | .................... C09J 4/06 349/122 |
| 6,989,879 B1 | * | 1/2006 | Nakahara | .............. G02F 1/1337 349/123 |
| 8,089,569 B2 | * | 1/2012 | Hoshi | .................. G02B 5/3083 349/117 |
| 8,531,764 B2 | * | 9/2013 | Park | .............................. 359/465 |

(Continued)

FOREIGN PATENT DOCUMENTS

| | | |
|---|---|---|
| CN | 101896842 A | 11/2010 |
| KR | 2005034850 A * | 4/2005 |

OTHER PUBLICATIONS

Chinese Office Action issued in Chinese Patent Application No. 201210435371.3 on Sep. 9, 2015.

*Primary Examiner* — Ricky D Shafer
(74) *Attorney, Agent, or Firm* — Morgan, Lewis & Bockius LLP

(57) ABSTRACT

The present disclosure relates to a polarization film having a black strip for applying to a patterned retarder type 3D display device. The present disclosure suggests a polarization film for a patterned retarder type display device comprising: a polarization base film; a upper base film disposed on a upper surface of the polarization base film; a lower base film disposed on a lower surface of the polarization base film; and a black strip formed one of a upper side of the polarization base film and a lower side of the polarization base film. According to the present disclosure, the 3D display device can be manufactured in the simple processing and can reduce 3D cross-talk problem by having the double black strip structure.

12 Claims, 9 Drawing Sheets

(56) References Cited

U.S. PATENT DOCUMENTS

| | | | |
|---|---|---|---|
| 8,624,963 B2* | 1/2014 | Lim | 348/51 |
| 8,654,159 B2* | 2/2014 | Hwang et al. | 345/694 |
| 8,743,188 B2* | 6/2014 | Kim | 348/58 |
| 8,760,505 B2* | 6/2014 | Baik et al. | 348/58 |
| 2009/0190213 A1* | 7/2009 | Tamura et al. | 359/465 |
| 2010/0265433 A1* | 10/2010 | Hoshi | 349/62 |
| 2011/0216277 A1* | 9/2011 | Chen et al. | 349/117 |
| 2012/0147281 A1* | 6/2012 | Matsuhiro et al. | 349/15 |
| 2012/0162763 A1* | 6/2012 | Son et al. | 359/463 |
| 2012/0182406 A1* | 7/2012 | Woo | 348/54 |
| 2012/0293866 A1* | 11/2012 | Park | 359/465 |

* cited by examiner

POLARIZATION FILM HAVING BLACK STRIP FOR APPLYING TO A PATTERNED RETARDER TYPE 3D DISPLAY DEVICE

This application claims the benefit of Korea Patent Application No. 10-2012-0054973 filed on May 23, 2012, which is incorporated herein by reference for all purposes as if fully set forth herein.

BACKGROUND OF THE INVENTION

Field of the Invention

The present disclosure relates to a polarization film having a black strip for applying to a patterned retarder type 3D display device. Especially, the present disclosure relates to a polarization film, as being combined with a patterned retarder on the outer side of the 3D display device, having a black strip for preventing the 3D cross-talk problem between the patterned retarder for the left-eye image and the patterned retarder for the right-eye image.

Discussion of the Related Art

Recently, thank to the advancement of the various video contents, the display devices which can selectively reproduce 2D images and 3D images are actively developed. For reproducing the 3D images, the display uses the stereoscopic technique or the autostereoscopic technique.

As one example of the glasses type, there is a 3D display device having a patterned retarder on the display panel. This 3D display device represents the 3D images using the polarization characteristics of the patterned retarder and the polarization glasses. Therefore, there is no cross-talk problem between the left eye image and the right eye image, and it ensure brighter luminescent so that the quality of the image is better than other type of 3D display device.

FIG. 1 is the perspective view illustrating the structure of a 3D display system having a patterned retarder according to the related art. The patterned retarder type 3D display system represents the 3D images using the polarization characteristics of the patterned retarder PR disposed on the display panel DP and those of the polarization glasses PG used by the observer.

Referring to FIG. 1, the patterned retarder type 3D display system includes a display panel DP representing 2D image or 3D image, a patterned retarder PR attached on the front surface of the display panel DP, and polarization glasses PG.

The display panel DP, as the device for displaying 2D video images and/or 3D video images, can include any one of the liquid crystal display device (or LCD), the field emission display (or FED), the plasma display panel (or PDP), the electroluminescence device (or EL) including the inorganic light emitting diode and the organic emitting diode (or OLED), and electrophoresis display device (or EPD). Hereinafter, we will explain the embodiments of the present disclosure focused on the case in which the display panel DP is the liquid crystal display panel.

The display panel DP includes liquid crystal cells disposed in matrix manner defined by the crossing structure of the data line and the gate line. The lower glass substrate SL of the display panel DP comprises the pixel arrays including the data lines, the gate lines, the thin film transistors, the pixel electrodes, and the storage capacitors. The upper glass substrate SU of the display panel DP comprises the black matrix, the color filter, and the common electrode. Each liquid crystal cell is driven by the electric field formed between the pixel electrode connected to the thin film transistor and the common electrode. Each inside surface of the upper glass substrate SU and the lower glass substrate SL has an alignment layer, respectively for setting up the pre tilt angle of the liquid crystal. Each outside surface of the upper glass substrate SU and the lower glass substrate SL has the upper polarization film PU and the lower polarization film PL, respectively.

The patterned retarder PR is attached on the outside surface of the upper polarization film PU of the display panel DP. The patterned retarder PR has a unit retarder corresponding to each line of pixel arrayed in the horizontal direction of the display panel DP. For example, one unit retarder can be defined as corresponding to the area of the pixels commonly connected to one gate line. Especially, the first retarder RT1 is formed as to be corresponding to the odd numbered lines of the patterned retarder PR, and the second retarder RT2 is formed as to be corresponding to the even numbered lines of the patterned retarder PR. The first retarder RT1 can transmit the first circular polarized light by retarding the phase of the light with $+\lambda/4$ (here, '$\lambda$' is the wavelength of the light incident from the pixel array). The second retarder RT2 can transmit the second circular polarized light by retarding the phase of the light with $-\lambda/4$ (actually, $+3\lambda/4$). The light absorbing axis (or light transmitting axis) of the first retarder RT1 and the light absorbing axis of the second retarder RT2 are perpendicular each other.

For example, the first retarder RT1 of the patterned retarder PR can be the polarizing filter transmitting the left circular polarized light, and the second retarder RT2 of the patterned retarder PR can be the polarizing filter transmitting the right circular polarized light. In this case, the light of the video images represented on the odd numbered lines of the display panel DP can transmit the first retarder RT1 and then it becomes to the first circular polarized light (i.e., the left circular polarized light). Furthermore, the light of the video image represented on the even numbered lines of the display panel DP can transmit the second retarder RT2 and then it becomes to the second circular polarized light (i.e., the right circular polarized light).

The polarization glasses PG comprises a left glass window LG having the first polarizing filter P1 and a right glass window RG having the second polarizing filter P2. The first polarizing filter P1 has the same light polarization characteristic with that of the first retarder RT1 of the patterned retarder PR. At the same time, the second polarizing filter P2 has the same light transmitting axis with that of the second retarder RT2 of the patterned retarder PR. For example, the first polarizing filter P1 of the polarization glasses PG can be the left circular polarizing filter, and the second polarizing filter P2 of the polarization glasses PG can be the right circular polarizing filter.

With this structure, by representing the left images on the pixels relating to the first retarder RT1, and representing the right images on the pixels relating to the second retarder RT2, the 3D images can be implemented. In the 3D display system as shown in FIG. 1, by setting the polarized light characteristic of the left eye images different from that of the right eye images, the left eye image and the right eye images can be separately reached to the observer's left eye and right eye, respectively.

In the 3D display device having the film patterned retarder, as the left eye image and the right eye image are alternatively represented in the unit of pixel row, there are some cross-talk problems at the wide view angle along to the up-down directions. FIG. 2 is a cross sectional view along the cutting line A-A' in FIG. 1 illustrating that the cross-talk problem occurring at the 3D display device as shown in FIG. 1.

Referring to FIG. 2, when observing the video data at upper side (or lower side) than the straight front direction, the left eye image L1 and the right eye image R1 can transmit through the first patterned retarder RT1, at the same time. As a result, the cross-talk problem is occurred in which the left eye image L1 and the right eye image R1 pass through the left glass window LG of the polarization glasses PG, at the same time. Even though, there is a black matrix BM at the border between the pixels in horizontal units, the black matrix BM does not have enough width to prevent the cross-talk problem.

In order to solve this cross-talk problem in the vertical view angle direction, some methods have been suggested. The first method is to make the width of the black matrix BM wider so that the wide view angle in which the cross-talk problem is not occurred can be ensured. FIG. 3 is the cross-sectional view illustrating the 3D display device in which the black matrix having wider width than the width of black matrix shown in FIG. 2.

Referring to FIG. 3, on the light path at which the right eye images R1 passes through the first retarder RT1, a black matrix BM having wider width is disposed so that the right eye image R1 passing through the first retarder RT1 can be blocked. Therefore, when an observer located at the straight front of the display device moves up side or down side somewhat, the cross-talk problems are not occurred. However, in this structure, in order to prevent the cross-talk problem more effectively, the black matrix BM should have remarkably wider width. As the width of the black matrix BM is getting wider, the aperture ratio at the front direction is getting lowered and then the brightness may be degraded or the correct color cannot be represented.

Like this, there is a trade-off relationship between the front aperture ratio and the cross-talk improvement. Furthermore, it is hard to find proper point therebetween. Therefore, required is a new method for ensuring the front aperture ratio and for enhancing the cross-talk problem at the same time.

SUMMARY OF THE INVENTION

In order to overcome the above mentioned drawbacks, the purpose of the present disclosure is to suggest a 3D display device having a wide viewing angle by reducing the 3D cross-talk problem. Another purpose of the present disclosure is to suggest a structure of the patterned retarder type 3D display device having a structure for easily and simply forming the black strip for preventing 3D cross-talk problem.

In order to accomplish the above purpose, the present disclosure suggests a polarization film for a patterned retarder type display device comprising: a polarization base film; a upper base film disposed on a upper surface of the polarization base film; a lower base film disposed on a lower surface of the polarization base film; and a black strip formed one of a upper side of the polarization base film and a lower side of the polarization base film.

The black strip is disposed between the polarization base film and the upper base film.

The black strip is disposed on the upper surface of the polarization base film.

The black strip is disposed on a lower surface of the upper base film.

The black strip is disposed between the polarization base film and the lower base film.

The black strip is disposed on the lower surface of the polarization base film.

The black strip is disposed on a upper surface of the lower base film.

The black strip is disposed on the upper surface of the upper base film.

The polarization film further comprises: an adhesive layer disposed on a lower surface of the lower base film; and a removable film temporarily attached on a lower surface of the adhesive layer, wherein the black strip is disposed on the lower surface of the lower base film.

The polarization film further comprises: a protection film attached on a upper surface of the upper base film, wherein the black strip is disposed on a upper surface of the protection film.

The polarization film further comprises: a film type patterned retarder positioning on a upper side of the upper base film and including a first retarder and a second retarder neighbored by the black strip.

The polarization film for a patterned retarder type 3D display device according to the present disclosure comprises a black strip disposed between neighboring unit patterned retarders. Therefore, in the present disclosure, the black strip is not formed on the display panel directly, but merely by the polarization film according to the present disclosure on the display panel, the black strip can be disposed between neighboring unit patterned retarders. As a result, according to the present disclosure, the 3D display device can be manufactured in the simple processing and can reduce 3D cross-talk problem by having the double black strip structure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
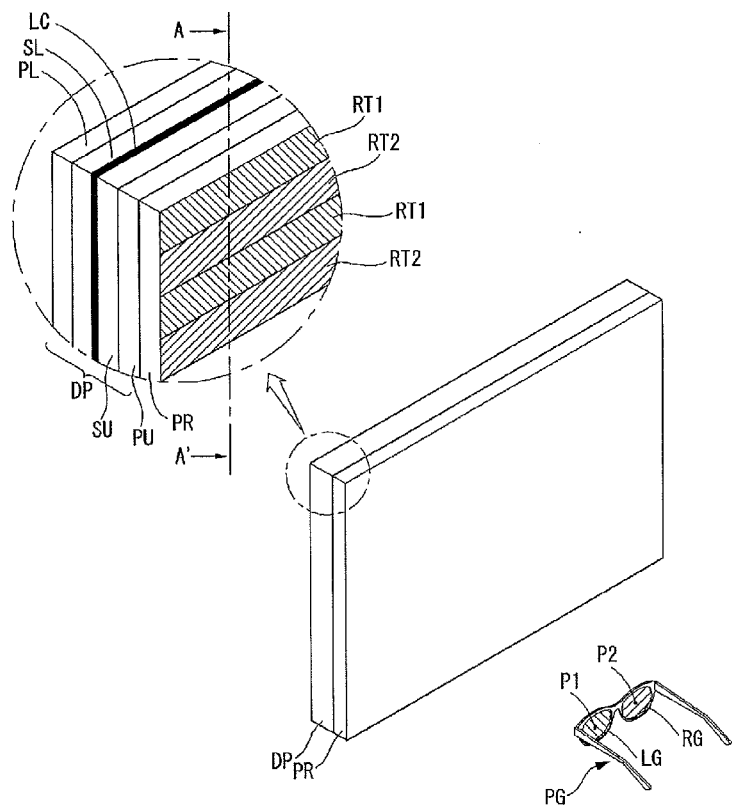
FIG. 1 is the perspective view illustrating the structure of a 3D display system having a patterned retarder according to the related art.
Figure 2:
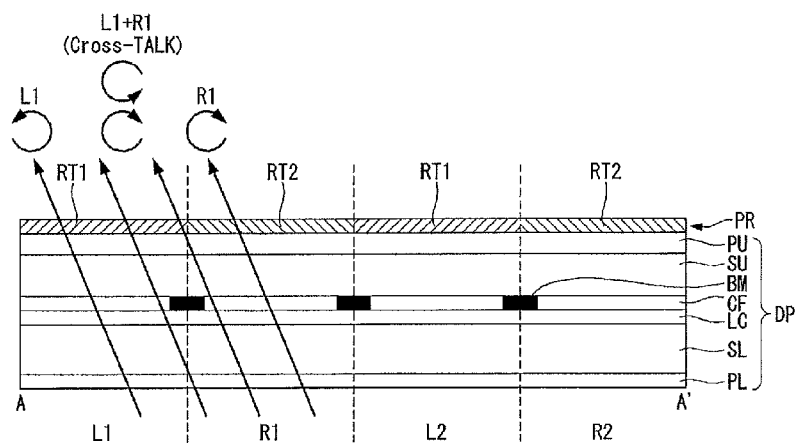
FIG. 2 is the cross sectional view along the cutting line A-A' in FIG. 1 illustrating that the cross-talk problem occurring at the 3D display device as shown in FIG. 1.
Figure 3:
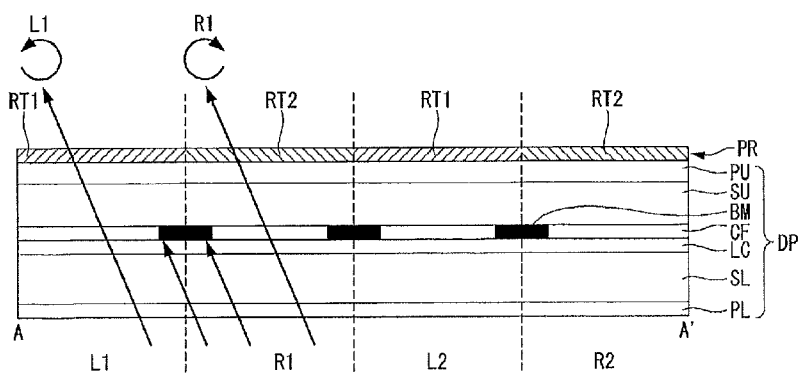
FIG. 3 is the cross-sectional view illustrating the 3D display device in which the black matrix having wider width than the width of black matrix shown in FIG. 2.

Referring to attached figures, we will explain preferred embodiments of the present disclosure. Like reference numerals designate like elements throughout the detailed description. However, the present disclosure is not restricted by these embodiments but can be applied to various changes or modifications without changing the technical spirit. In the following embodiments, the names of the elements are selected by considering the easiness for explanation so that they may be different from actual names.

Figure 4:
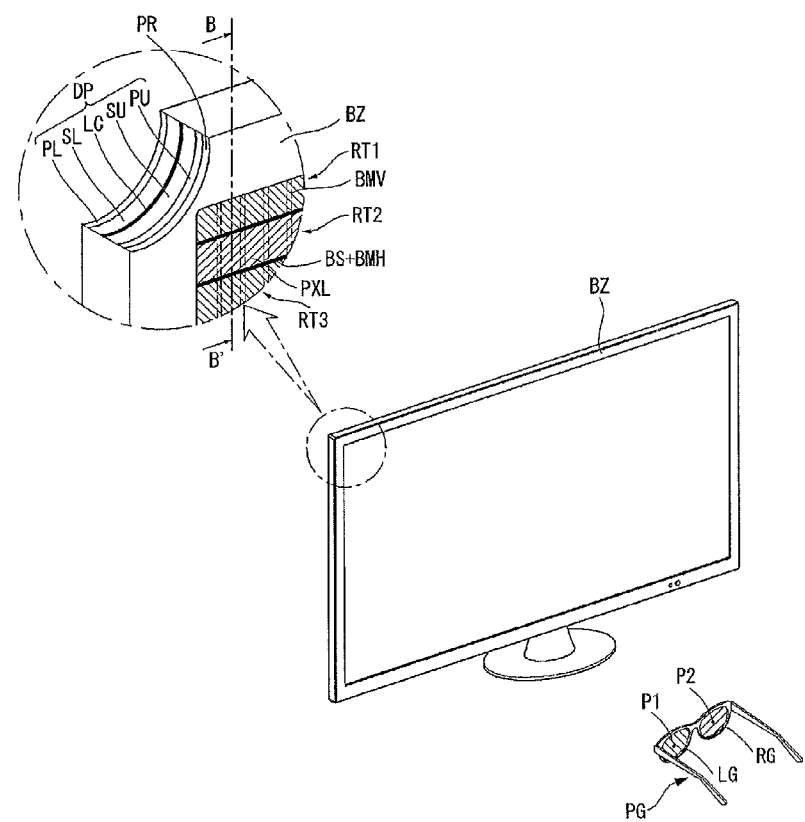
FIG. 4 is a perspective view illustrating a structure of a patterned retarder type 3D display panel having a double-black strip, according to the first embodiment of the present disclosure.
Figure 5:
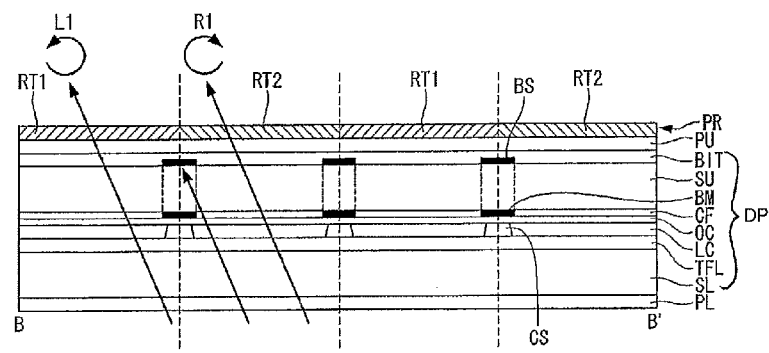
FIG. 5 is a cross-sectional views illustrating a structure of a patterned retarder type 3D display panel along the cutting line B-B' in FIG. 4, according to the first embodiment.

Referring to FIG. 4 and FIG. 5, we will explain the first embodiment according to the present disclosure. FIG. 4 is the perspective view illustrating the structure of a patterned retarder type 3D display panel having a double-black strip, according to the first embodiment of the present disclosure. FIG. 5 is a cross-sectional views illustrating a structure of a patterned retarder type 3D display panel along the cutting line B-B' in FIG. 4, according to the first embodiment.

At first, referring to FIG. 4, the 3D display system according to the first embodiment of the present disclosure represents the 3D images using the polarization characteristics of the patterned retarder PR disposed on the display panel DP and those of the polarization glasses PG used by the observer.

As shown in FIG. 4, the patterned retarder type 3D display system includes a display panel DP representing 2D image or 3D image, a patterned retarder PR attached on the front surface of the display panel DP, and polarization glasses PG. The display panel DP, as the device for displaying 2D video images and/or 3D video images, can include any one of the liquid crystal display device (or LCD), the field emission display (or FED), the plasma display panel (or PDP), the electroluminescence device (or EL) including the inorganic light emitting diode and the organic emitting diode (or OLED), and electrophoresis display device (or EPD). Hereinafter, we will explain the embodiments of the present disclosure focused on the case in which the display panel DP is the liquid crystal display panel.

The display panel DP includes liquid crystal cells disposed in matrix manner defined by the crossing structure of the data line and the gate line. The lower glass substrate SL of the display panel DP comprises the pixel arrays including the data lines, the gate lines, the thin film transistors, the pixel electrodes, and the storage capacitors. The upper glass substrate SU of the display panel DP comprises the black matrix, the color filter, and/or the common electrode. Each liquid crystal cell is driven by the electric field formed between the pixel electrode connected to the thin film transistor and the common electrode. Each outside surface of the upper glass substrate SU and the lower glass substrate SL has the upper polarization film PU and the lower polarization film PL, respectively. They may be disposed in a manner that the light transmitting axes of them are perpendicularly crossed.

The patterned retarder PR is attached on the outside surface of the upper polarization film PU of the display panel DP. The patterned retarder PR has a unit retarder corresponding to each line of pixel arrayed in the horizontal direction of the display panel DP. For example, one unit retarder can be defined as corresponding to the area of the pixels commonly connected to one gate line. Especially, the first retarder RT1 is formed as to be corresponding to the odd numbered lines of the patterned retarder PR, and the second retarder RT2 is formed as to be corresponding to the even numbered lines of the patterned retarder PR. The first retarder RT1 can transmit the first circular polarized light by retarding the phase of the light with +λ/4 (here, 'λ' is the wavelength of the light incident from the pixel array). The second retarder RT2 can transmit the second circular polarized light by retarding the phase of the light with −λ/4 (actually, +3λ/4). The light absorbing axis (or light transmitting axis) of the first retarder RT1 and the light absorbing axis of the second retarder RT2 are perpendicular each other.

For example, the first retarder RT1 of the patterned retarder PR can be the polarizing filter transmitting the left circular polarized light, and the second retarder RT2 of the patterned retarder PR can be the polarizing filter transmitting the right circular polarized light. In this case, the light of the video images represented on the odd numbered lines of the display panel DP can transmit the first retarder RT1 and then it becomes to the first circular polarized light (i.e., the left circular polarized light). Furthermore, the light of the video image represented on the even numbered lines of the display panel DP can transmit the second retarder RT2 and then it becomes to the second circular polarized light (i.e., the right circular polarized light).

The polarization glasses PG comprises a left glass window LG having the first polarizing filter P1 and a right glass window RG having the second polarizing filter P2. The first polarizing filter P1 has the same light polarization characteristic with that of the first retarder RT1 of the patterned retarder PR. At the same time, the second polarizing filter P2 has the same light transmitting axis with that of the second retarder RT2 of the patterned retarder PR. For example, the first polarizing filter P1 of the polarization glasses PG can be the left circular polarizing filter, and the second polarizing filter P2 of the polarization glasses PG can be the right circular polarizing filter.

With this structure, by representing the left images on the pixels relating to the first retarder RT1, and representing the right images on the pixels relating to the second retarder RT2, the 3D images can be implemented. In the 3D display system as shown in FIG. 4, by setting the polarized light characteristic of the left eye images different from that of the right eye images, the left eye image and the right eye images can be separately reached to the observer's left eye and right eye, respectively.

Especially, when 3D video data is represented on the display panel DP, one left eye image or one right eye image are alternately displayed at every pixel row. The black strip BS for preventing the cross-talk problem between the left eye images and the right eye images is disposed on the outer surface of the upper substrate SU (between the upper substrate SU and the upper polarization film PU). Furthermore, the black strip BS having the same or narrower width than that of the horizontal black matrix BMH, is disposed within the area which is corresponded to the horizontal black matrix BMH formed on the inner surface of the upper substrate SU.

In FIG. 4, the vertical black matrix BMV is formed on the inner surface of the upper substrate SU so it is shown as the dotted line. On the contrary, the black strip BS overlapping with the horizontal black matrix BMH is formed on the outer surface of the upper substrate SU, so it is shown as the black solid strip.

Furthermore, in FIG. 4, the drawing symbol 'BZ' means the bezel area. The bezel area BZ includes the non-display area where the sealant is disposed to join the upper substrate SU and the lower substrate SL of the display panel DP, where the driving circuit is disposed and/or where some electrical elements connecting the driving circuit and display elements are formed.

Hereinafter, referring to FIG. 5, we will explain the structure of a patterned retarder type 3D display device panel according to the first embodiment of the present disclosure, in detail. On the inner surface of the transparent lower substrate SL, the pixel areas disposed in a matrix type are defined by forming the gate lines and the data lines crossing each other. In each pixel area, thin film transistor and the pixel electrode driven by the thin film transistor are formed. In the FIG. 5, the layer including the display driving elements such as the thin film transistors and the pixel electrodes are illustrated as the thin film transistor layer TFL, simply.

On the outer surface of the transparent upper substrate SU used for the color filter substrate, a plurality of black strips BS is formed. Especially, as the display panel DP according to the present disclosure has a plurality of patterned retarders PR running to the horizontal direction, each black strip BS is disposed between the unit patterned retarders RT1 and RT2. In order to effectively prevent the 3D cross-talk and the reduction of the aperture ratio, it is preferable that the width of the black strip BS is equal to or less than that of the black matrix BM. Furthermore, it is more preferable that the black strip BS has the same width with that of the black matrix BM and is disposed as overlapping with the black matrix BM in the vertical space.

For example, on the case of small area display panel such as the portable personal digital device and/or notebook computer, it is preferable that the black strip BS is completely overlapped with the horizontal black matrix BMH on the vertical space. On the contrary, on the case of large area display panel such as TV monitor, the black strip BS may be overlapped with the some area of the horizontal black matrix BMH, in order to ensure optimized view condition at the central position of the up-down view angle in front of the display panel. On the whole surface on which the black strip BS is formed, a back surface electrode BIT is disposed. The back surface electrode BIT is for removing the static electricity which may be charged during the manufacturing of the display panel DP.

As shown in FIG. 5, on the inner surface of the upper substrate SU, the black matrix BM is formed. The black matrix BM, as the border line distinguishing the pixel area, includes the horizontal black matrix BMH running to the horizontal direction of the display panel DP, and the vertical black matrix BMV running to the vertical direction of the display panel DP. For example, the horizontal black matrix BMH is disposed at the area corresponding to the gate line, and the vertical black matrix BMV is dispose at the area corresponding to the data line. Here, the horizontal black matrix BMH is preferably disposed as (completely or partially) overlapping with the black strip BS on the vertical space. As a result, the color filter area corresponding to the pixel area can be defined by the black matrix BM.

After that, within the color filter area, the color filter CF is formed. In some cases, the color filter CF may be formed prior to the black matrix BM. On the color filter CF, the over coat layer OC is disposed as covering the whole surface. Even though it is not shown in drawings, on the over coat layer OC, the alignment layer for deciding the initial alignment of the liquid crystal molecules may be further disposed. Otherwise, the over coat layer OC itself may be used as the alignment layer. On the over coat layer OC, the column spacer CS is formed for maintaining the cell gap between the thin film transistor substrate and the color filter substrate. The column spacer CS is preferably formed within the area of the black matrix BM.

As shown in FIG. 5, the thin film transistor substrate and the color filter substrate are joined each other with the liquid crystal layer LC therebetween. By the column spacer CS, the cell gap between the upper substrate SU and the lower substrate SL can be maintained constantly and evenly. On the outer surface of the lower substrate SL, the lower polarization film PL is attached. In the same manner, on the outer surface of the upper substrate SU, the upper polarization film PU is attached. Furthermore, on the upper polarization film PU, the patterned retarder for representing the 3D images is attached. Especially, the patterned retarder PR is preferably formed in film type.

The black strip BS is overlapped with the black matrix BM, especially the horizontal black matrix BMH. Further, when seeing it from the front direction, it is important to decide the overlapping area in manner that the whole areas including the black strip BS and the horizontal black matrix BMH should not degrade the front direction aperture ratio of the display panel. For example, in the cases of small area display panel such as the portable personal display device, it is preferable that the black strip BS and the horizontal black matrix BMH would have the same width and be completely overlapped each other. However, in the cases of large area display panel such as TV monitor, the black strip BS may be overlapped with some portions of the horizontal black matrix BMH. In these cases, the black strip BS may has a width equal to or less than the width of the horizontal black matrix BMH and be overlapped with some portions of the horizontal black matrix BMH. The overlapping structure should be decided in manner that, when viewing in front direction, the areas of the black strip BS which are not overlapped with the horizontal black matrix BMH should not degrade the aperture ratio of the display panel DP. As a result, when the 3D video images are represented, it is possible to ensure the same front brightness when the 2D video images are represented.

Furthermore, as the black strip BS and the black matrix BM are formed on the outer surface and on the inner surface of the upper substrate SU, respectively, it has the double black strip structure (as the black matrix works like the black strip) in which two black strips are overlapping with the thickness of the upper substrate SU. Therefore, the cross-talk between the left-eye image and the right-eye image can be effectively prevented.

The 3D display panel having the above mentioned structure has substantially similar structure of the general LCD display panel. Additionally, it has the black strip BS. Therefore, in the aspect of manufacturing process, it may be an important issue how to form or dispose the black strip on the outer surface of the upper substrate SU. In the first embodiment, we explained the case in which the black strip BS is directly formed on the outer surface of the upper substrate SU.

Hereinafter, in the other embodiments, the black strip is not formed directly on the outer surface of the upper substrate SU. Instead, the black strip BS may be formed on the upper polarization film PU attached on the outer surface of the upper substrate SU, or embedded into the upper polarization film PU and/or the film type patterned retarder PR. Therefore, according to the present disclosure, by attaching the upper polarization film PU having the black strip BS on the outer side of the display panel DP, it is possible to simply and easily manufacture the 3D display panel having the black strip BS without any additional complex manufacturing process for disposing the black strip BS.

Figure 6:
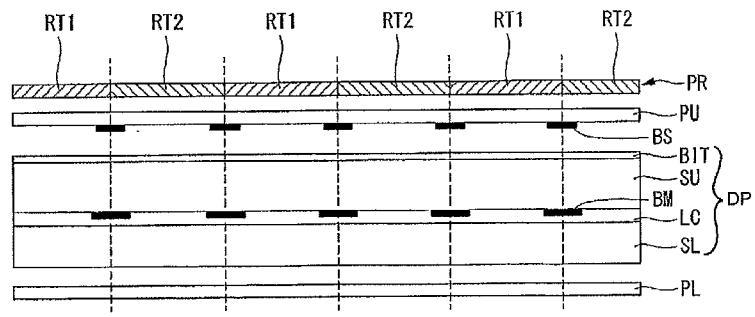
FIG. 6 is a cross-sectional view illustrating the structure of a polarization film having a black strip applied to a patterned retarder type 3D display panel and a 3D display device using the same polarization film, according to the second embodiment of the present disclosure.

FIG. 6 is a cross-sectional view illustrating the structure of a polarization film having a black strip applied to a patterned retarder type 3D display panel and a 3D display device using the same polarization film, according to the second embodiment of the present disclosure. As explained in the first embodiment, the patterned retarder type 3D display device includes a display panel DP representing 2D image or 3D image, a patterned retarder PR attached on the front surface of the display panel DP, and polarization glasses PG. As the other embodiments, hereinafter, is focused on the black strip, we will explain about the display panel DP and the patterned retarder PR mainly, except the polarization glasses PG.

Referring to FIG. 6, the patterned retarder type 3D display device according to the second embodiment includes a display panel DP representing 2D image or 3D image and a patterned retarder PR attached on the front surface of the display panel DP. The display panel DP includes an LCD display panel having a upper substrate SU and a lower substrate SL joined each other with a liquid crystal layer LC there-between. It further comprises a upper polarization film PU attached on the upper outer surface of the LCD display panel and a lower polarization film PL attached on the lower outer surface of the LCD display panel. On the upper outer side of the upper polarization film PU, a patterned retarder PR is disposed.

For the LCD display panel, on the inner side of the LCD panel contacting the liquid crystal layer LC, the black matrix BM defining the pixel area is disposed in a grid type and a plurality of the pixel areas are arrayed in a matrix manner. On the upper outer surface of the upper substrate SU of the LCD panel, the back surface electrode BIT is disposed as covering the whole surface. The upper polarization film PU is attached on the back surface electrode BIT. Furthermore, on the lower surface of the upper polarization film PU, i.e. faced contacting the back surface electrode BIT, the black strip BS overlapping with the black matrix BM is disposed.

As explained in the first embodiment, the black strip BS according to the present disclosure is preferably disposed between the first retarder RT1 for representing the left-eye image and the second retarder RT2 for representing the right-eye image. Therefore, as the black strip BS would be allocated between neighboring two unit retarders RT1 and RT2, the black strip BS is preferably disposed as overlapping with the black matrix BM, especially horizontal black matrix BMH running to horizontal direction.

In the second embodiment, as the black strip BS is disposed on the lower surface of the upper polarization film PU, it is not required to manufacture the black strip BS when the display panel DP is manufactured. Just required is to attach the upper polarization film PU to the LCD panel. Further required is to align the black strip BS with the black matrix BM, especially running to horizontal direction and to attach the upper polarization film PU to the upper substrate SU of the LCD panel.

Figure 7:
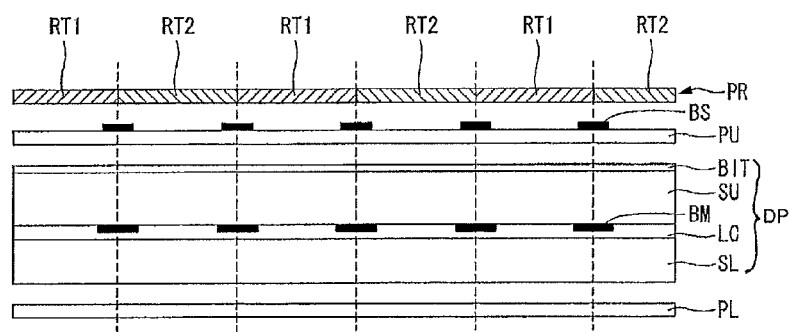
FIG. 7 is a cross-sectional view illustrating the structure of a polarization film having a black strip applied to a patterned retarder type 3D display panel and a 3D display device using the same polarization film, according to the third embodiment of the present disclosure.

For the third embodiment, the basic structure is very similar with that of the second embodiment. Different point is that the black strip BS is disposed on the upper outer surface of the upper polarization film PU. FIG. 7 is a cross-sectional view illustrating the structure of a polarization film having a black strip applied to a patterned retarder type 3D display panel and a 3D display device using the same polarization film, according to the third embodiment of the present disclosure. Referring to FIG. 7, the black strip BS is formed on the outer surface of the most upper layer of the upper polarization film PU. According to the structure of the upper polarization film PU, it may be decided where the black strip BS is formed, in detail. For example, as shown FIGS. 9 to 14 for the fourth embodiment which will be explained later, when a protection film PT is the upper most element of the upper polarization film PU, it is preferable that the black strip BS may be disposed on the upper surface of the protection film PT. As the other structure of the third embodiment is not different from the second embodiment, detailed explanation will not be mentioned.

Figure 8:
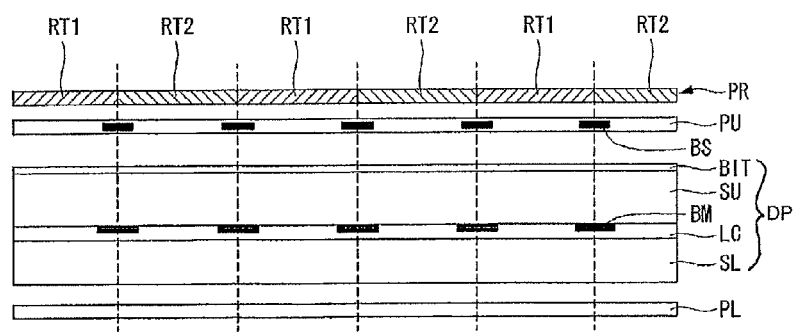
FIG. 8 is a cross-sectional view illustrating the structure of a polarization film having a black strip applied to a patterned retarder type 3D display panel and a 3D display device using the same polarization film, according to the fourth embodiment of the present disclosure.

For the fourth embodiment, the basic structure is also very similar with that of the second embodiment. Different point is that the black strip BS is placed inside of the upper polarization film PU. FIG. 8 is a cross-sectional view illustrating the structure of a polarization film having a black strip applied to a patterned retarder type 3D display panel and a 3D display device using the same polarization film, according to the fourth embodiment of the present disclosure. As the most other structures of the third embodiment are not different from the second embodiment, detailed explanation will not be mentioned. However, how to dispose the black strip BS inside of the upper polarization film PU will be explained in detail referring to related figures.

Hereinafter, referring to FIGS. 9 to 14, the variations of the fourth embodiment will be explained. The key feature of the fourth embodiment is that the black strip BS is formed in the upper polarization film PU.

Figure 9:
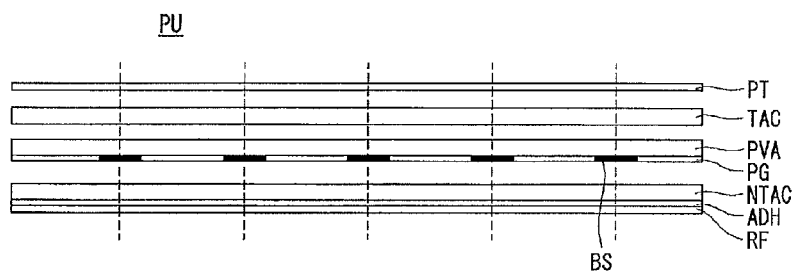
FIG. 9 is a cross-sectional view illustrating the structure of a polarization film having a black strip applied to a patterned retarder type 3D display panel, according to the $1^{st}$ variation of the fourth embodiment of the present disclosure.

FIG. 9 is a cross-sectional view illustrating the structure of a polarization film having a black strip applied to a patterned retarder type 3D display panel, according to the 1$^{st}$ variation of the fourth embodiment of the present disclosure. Referring to FIG. 9, the upper polarization film PU comprises a polarization base film PVA having the polarization features, a upper base film TAC attached on the upper side of the polarization base film PVA, a lower base film NTAC attached on the lower side of the polarization base film PVA, and a protection film PT attached on the upper side of the upper base film TAC. Furthermore, on the lower outer side of the lower base film NTAC, an adhesive layer ADH for attaching the upper polarization film PU onto the upper substrate SU. Finally, a removable film RF for protecting the adhesive layer ADH is temporarily attached.

The key point of the 1$^{st}$ variation of the fourth embodiment is that the black strip BS is formed on the lower outer surface of the polarization base film PVA. Especially, after depositing a transparent pigment layer PG on the lower outer surface of the polarization base film PVA, the black strip BS having a predetermined width overlapping with the horizontal black matrix BM (BMH) may be formed by darkening some portions of the transparent pigment layer PG using a laser. After that, peeling off the removable film RF from the upper polarization film PU, attaching the upper polarization film PU onto the upper outer surface of the upper substrate SU, and attaching the patterned retarder PR on the upper side of the upper polarization film PU, the patterned retarder type 3D display panel DP having the black strip BS is completed.

Figure 10:
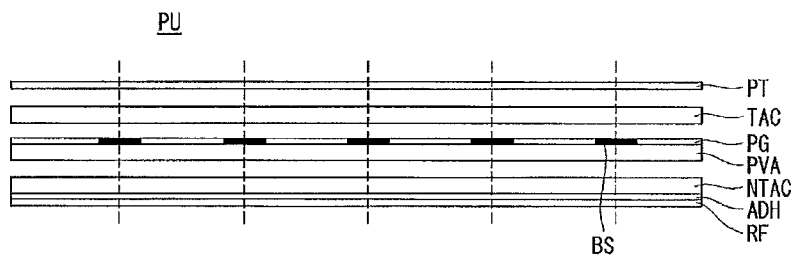
FIG. 10 is a cross-sectional view illustrating the structure of a polarization film having a black strip applied to a patterned retarder type 3D display panel, according to the $2^{nd}$ variation of the fourth embodiment of the present disclosure.

FIG. 10 is a cross-sectional view illustrating the structure of a polarization film having a black strip applied to a patterned retarder type 3D display panel, according to the 2$^{nd}$ variation of the fourth embodiment of the present disclosure. The key feature of the 2$^{nd}$ variation of the fourth embodiment is that the black strip BS is formed on the upper outer surface of the polarization base film PVA. Especially, after depositing a transparent pigment layer PG on the upper outer surface of the polarization base film PVA, the black strip BS having a predetermined width overlapping with the horizontal black matrix BM (BMH) may be formed by darkening some portions of the transparent pigment layer PG using a laser. After that, peeling off the removable film RF from the upper polarization film PU, attaching the upper polarization film PU onto the upper outer surface of the upper substrate SU, and attaching the patterned retarder PR on the upper side of the upper polarization film PU, the patterned retarder type 3D display panel DP having the black strip BS is completed.

Figure 11:
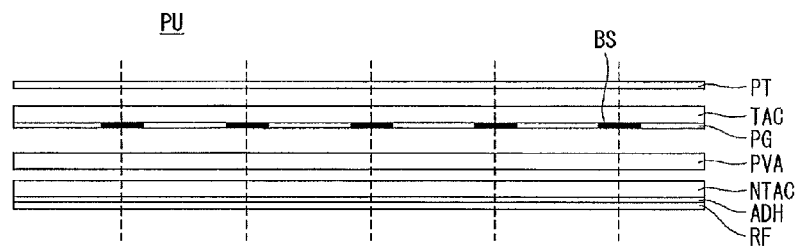
FIG. 11 is a cross-sectional view illustrating the structure of a polarization film having a black strip applied to a patterned retarder type 3D display panel, according to the $3^{rd}$ variation of the fourth embodiment of the present disclosure.

FIG. 11 is a cross-sectional view illustrating the structure of a polarization film having a black strip applied to a patterned retarder type 3D display panel, according to the 3$^{rd}$ variation of the fourth embodiment of the present disclosure. The key feature of the 3$^{rd}$ variation of the fourth embodiment is that the black strip BS is formed on the lower outer surface of the upper base film TAC. Especially, after depositing a transparent pigment layer PG on the lower outer surface of the upper base film TAC, the black strip BS having a predetermined width overlapping with the horizontal black matrix BM (BMH) may be formed by darkening some portions of the transparent pigment layer PG using a laser. After that, peeling off the removable film RF from the upper polarization film PU, attaching the upper polarization film PU onto the upper outer surface of the upper substrate SU, and attaching the patterned retarder PR on the upper side of the upper polarization film PU, the patterned retarder type 3D display panel DP having the black strip BS is completed.

Figure 12:
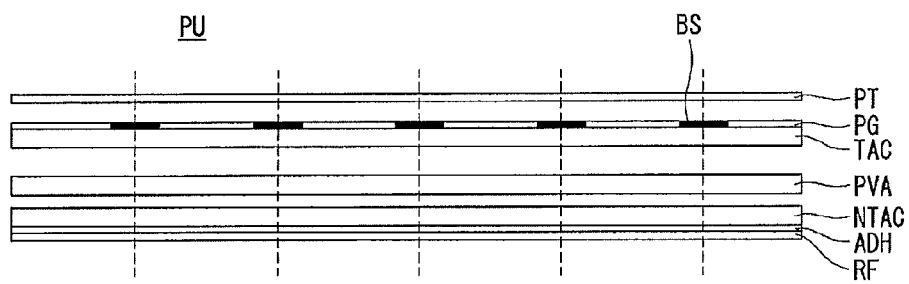
FIG. 12 is a cross-sectional view illustrating the structure of a polarization film having a black strip applied to a patterned retarder type 3D display panel, according to the $4^{th}$ variation of the fourth embodiment of the present disclosure.

FIG. 12 is a cross-sectional view illustrating the structure of a polarization film having a black strip applied to a patterned retarder type 3D display panel, according to the 4$^{th}$ variation of the fourth embodiment of the present disclosure. The key feature of the 4$^{th}$ variation of the fourth embodiment is that the black strip BS is formed on the upper outer surface of the upper base film TAC. Especially, after depositing a transparent pigment layer PG on the upper outer surface of the upper base film TAC, the black strip BS having a predetermined width overlapping with the horizontal black matrix BM (BMH) may be formed by darkening some portions of the transparent pigment layer PG using a laser. After that, peeling off the removable film RF from the upper polarization film PU, attaching the upper polarization film PU onto the upper outer surface of the upper substrate SU, and attaching the patterned retarder PR on the upper side of the upper polarization film PU, the patterned retarder type 3D display panel DP having the black strip BS is completed.

Figure 13:
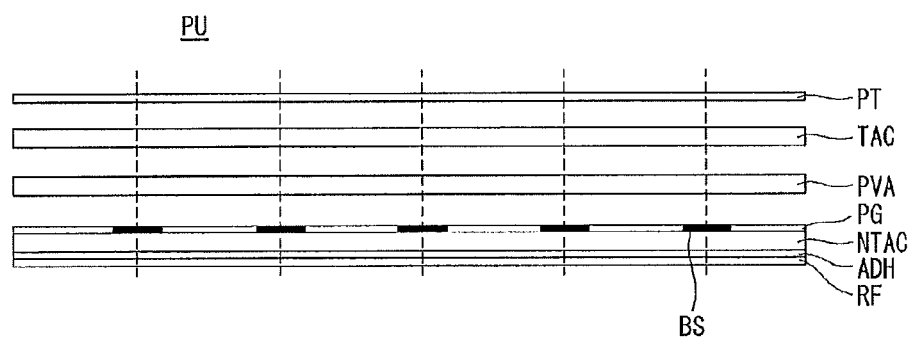
FIG. 13 is a cross-sectional view illustrating the structure of a polarization film having a black strip applied to a patterned retarder type 3D display panel, according to the $5^{th}$ variation of the fourth embodiment of the present disclosure.

FIG. 13 is a cross-sectional view illustrating the structure of a polarization film having a black strip applied to a patterned retarder type 3D display panel, according to the 5$^{th}$ variation of the fourth embodiment of the present disclosure. The key feature of the 5$^{th}$ variation of the fourth embodiment is that the black strip BS is formed on the upper outer surface of the lower base film NTAC. Especially, after depositing a transparent pigment layer PG on the upper outer surface of the lower base film NTAC, the black strip BS having a predetermined width overlapping with the horizontal black matrix BM (BMH) may be formed by darkening some portions of the transparent pigment layer PG using a laser. After that, peeling off the removable film RF from the upper polarization film PU, attaching the upper polarization film PU onto the upper outer surface of the upper substrate SU, and attaching the patterned retarder PR on the upper side of the upper polarization film PU, the patterned retarder type 3D display panel DP having the black strip BS is completed.

Figure 14:
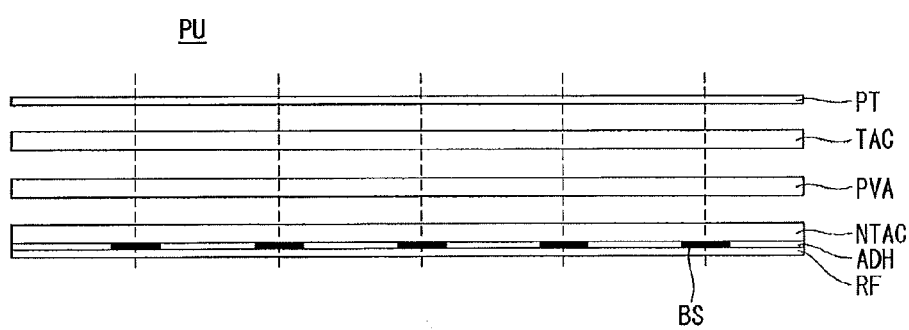
FIG. 14 is a cross-sectional view illustrating the structure of a polarization film having a black strip applied to a patterned retarder type 3D display panel, according to the $6^{th}$ variation of the fourth embodiment of the present disclosure.

FIG. 14 is a cross-sectional view illustrating the structure of a polarization film having a black strip applied to a patterned retarder type 3D display panel, according to the 6$^{th}$ variation of the fourth embodiment of the present disclosure. The key feature of the 6$^{th}$ variation of the fourth embodiment is that the black strip BS is formed on the lower outer surface of the lower base film NTAC. Especially, after forming the black strip BS having a predetermined width overlapping with the horizontal black matrix BM (BMH) on the lower outer surface of the lower base film NTAC, the adhesive layer ADH is deposited as covering the whole surface having the black strip BS. Otherwise, after depositing the adhesive layer ADH including a transparent pigment material on the lower outer surface of the lower base film NTAC, the black strip BS having a predetermined width overlapping with the horizontal black matrix BM (BMH) may be formed by darkening some portions of the transparent pigment layer PG using a laser. After that, peeling off the removable film RF from the upper polarization film PU, attaching the upper polarization film PU onto the upper outer surface of the upper substrate SU, and attaching the patterned retarder PR on the upper side of the upper polarization film PU, the patterned retarder type 3D display panel DP having the black strip BS is completed.

From the second embodiment to the fourth embodiment, we will explain about various examples in which the black strip BS is directly formed at the upper polarization film PU. On the other hands, for more easy and simple method for manufacturing the patterned retarder type 3D display panel, it is preferable to form the patterned retarder in a film type. Especially, by making the patterned retarder PR as embedded with the upper polarization film PU, it is possible to simplify the manufacturing process.

Figure 15:
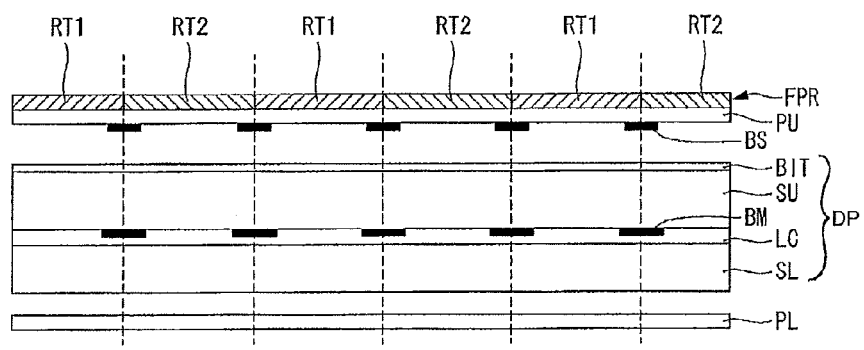
FIG. 15 is a cross-sectional view illustrating the structure of a polarization film having a black strip applied to a patterned retarder type 3D display panel, according to the fifth embodiment of the present disclosure.

FIG. 15 is a cross-sectional view illustrating the structure of a polarization film having a black strip applied to a patterned retarder type 3D display panel, according to the fifth embodiment of the present disclosure. For the fifth embodiment, the basic structure is very similar with that of the second embodiment. Different point is that the patterned retarder PR is made in a film type and manufactured in one body with the upper polarization film PU.

Referring to FIG. 15, the fifth embodiment suggests a structure in which the film type patterned retarder FPR is attached on the upper outer surface of the upper polarization film PU. Furthermore, on the lower outer surface of the upper polarization film PU, the black strip BS is formed between the first retarder RT1 and the second retarder RT2 of the film type patterned retarder FPR as overlapping with the black matrix BM.

Figure 16:
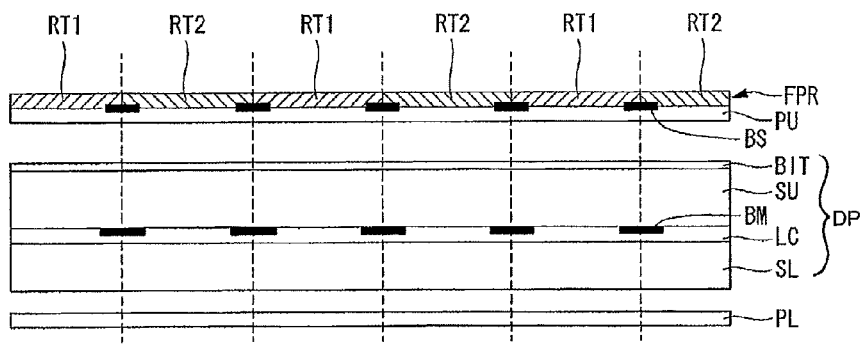
FIG. 16 is a cross-sectional view illustrating the structure of a polarization film having a black strip applied to a patterned retarder type 3D display panel, according to the sixth embodiment of the present disclosure.

FIG. 16 is a cross-sectional view illustrating the structure of a polarization film having a black strip applied to a patterned retarder type 3D display panel, according to the sixth embodiment of the present disclosure. For the sixth embodiment, the basic structure is very similar with that of the third embodiment. Different point is that the patterned retarder PR is made in a film type and manufactured in one body with the upper polarization film PU.

Referring to FIG. 16, the sixth embodiment suggests a structure in which the upper polarization film PU and the film type patterned retarder FPR are combined each other with the black strip BS there-between. In detail, the upper surface of the upper polarization film PU is joined with the lower surface of the film type patterned retarder FPR, facing each other. Furthermore, between the first retarder RT1 and the second retarder RT2, the black strip BS is disposed as overlapping with the black matrix BM running in horizontal direction.

Figure 17:
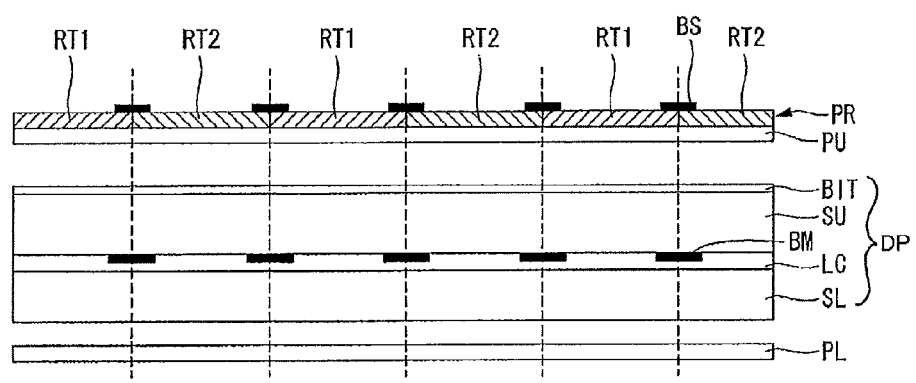
FIG. 17 is a cross-sectional view illustrating the structure of a polarization film having a black strip applied to a patterned retarder type 3D display panel, according to the seventh embodiment of the present disclosure.

FIG. 17 is a cross-sectional view illustrating the structure of a polarization film having a black strip applied to a patterned retarder type 3D display panel, according to the seventh embodiment of the present disclosure. For the seventh embodiment, the basic structure is very similar with that of the fifth embodiment. Different point is that the patterned retarder film FPR and the upper polarization film PU is combined each other and manufactured in one body. Furthermore, on the upper outer surface of the film type patterned retarder FPR, the black strip BS is formed. That is, between the first retarder RT1 and the second retarder RT2, the black strip BS is disposed as overlapping with the black matrix BM running in horizontal direction.

From the first embodiment to the fourth embodiment, the display panel DP comprises the upper polarization film PU and the lower polarization film PL, and the patterned retarder PR is explained as an additional element to the display panel DP. However, from the fifth embodiment to the seventh embodiment, as the film type patterned retarder FPR is manufactured as one body with the upper polarization film PU, in FIGS. 15 to 17, it is explained and illustrated that the film type patterned retarder FPR is included into the display panel DP.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A polarization film on a display panel comprising:
a polarization base film;
an upper base film disposed on an upper surface of the polarization base film;
a lower base film disposed on a lower surface of the polarization base film; and
a black strip formed on one of an upper side of the polarization base film and a lower side of the polarization base film,
wherein an upper substrate of the display panel includes a black matrix, and an outside surface of the upper substrate has the polarization film,
wherein the black strip is disposed between the polarization base film and the upper base film, and
wherein the black strip overlaps with the black matrix, and has a smaller width than the black matrix.

2. The polarization film according to the claim 1, wherein the black strip is disposed on the upper surface of the polarization base film.

3. The polarization film according to the claim 1, wherein the black strip is disposed on the lower surface of the upper base film.

4. The polarization film according to the claim 1, further comprising:
a protection film attached on the upper surface of the upper base film.

5. The polarization film according to the claim 1, further comprising:
a film type patterned retarder positioning on the upper surface of the upper base film and including a first retarder and a second retarder that overlap with the black strip.

6. The polarization film according to the claim 1, wherein the black strip entirely overlaps with the black matrix.

7. A polarization film on a display panel comprising:
a polarization base film;
an upper base film disposed on an upper surface of the polarization base film;
a lower base film disposed on a lower surface of the polarization base film; and
a black strip formed on one of an upper side of the polarization base film and a lower side of the polarization base film,
wherein an upper substrate of the display panel includes a black matrix, and an outside surface of the upper substrate has the polarization film, and
wherein the black strip is disposed between the polarization base film and the lower base film.

8. The polarization film according to the claim 7, wherein the black strip is disposed on the lower surface of the polarization base film.

9. The polarization film according to the claim 7, wherein the black strip is disposed on the upper surface of the lower base film.

10. A polarization film on a display panel comprising:
a polarization base film;
an upper base film disposed on an upper surface of the polarization base film;
a lower base film disposed on a lower surface of the polarization base film; and a black strip formed on one of an upper side of the polarization base film and a lower side of the polarization base film, wherein an upper substrate of the display panel includes a black matrix, and an outside surface of the upper substrate has the polarization film, wherein the black strip is disposed on the upper surface of the upper base film, and wherein the black strip overlaps with the black matrix, and has a smaller width than the black matrix.

11. The polarization film according to the claim 10, wherein the black strip entirely overlaps with the black matrix.

12. A polarization film on a display panel comprising:
a polarization base film;
an upper base film disposed on an upper surface of the polarization base film;
a lower base film disposed on a lower surface of the polarization base film;
a black strip formed on one of an upper side of the polarization base film and a lower side of the polarization base film; and
an adhesive layer disposed on a lower surface of the lower base film,
wherein the black strip is disposed on the lower surface of the lower base film, and
wherein an upper substrate of the display panel includes a black matrix, and an outside surface of the upper substrate has the polarization film.

\* \* \* \* \*